(12) United States Patent
Hughes

(10) Patent No.: US 9,560,046 B2
(45) Date of Patent: Jan. 31, 2017

(54) DEVICE NOTARIZATION

(71) Applicant: Kaiser Foundation Hospitals, Oakland, CA (US)

(72) Inventor: Alexander Z. Hughes, Piedmont, CA (US)

(73) Assignee: Kaiser Foundation Hospitals, Oakland, CA (US)

( * ) Notice: Subject to any disclaimer, the term of this patent is extended or adjusted under 35 U.S.C. 154(b) by 119 days.

(21) Appl. No.: 14/536,353

(22) Filed: Nov. 7, 2014

(65) Prior Publication Data

US 2016/0134626 A1 May 12, 2016

(51) Int. Cl.
*H04L 29/06* (2006.01)

(52) U.S. Cl.
CPC ....... *H04L 63/0869* (2013.01); *H04L 63/0435* (2013.01); *H04L 63/08* (2013.01); *H04L 63/126* (2013.01)

(58) Field of Classification Search
USPC ...................................... 713/168, 171; 726/7
See application file for complete search history.

(56) References Cited

U.S. PATENT DOCUMENTS

| | | |
|---|---|---|
| 6,595,856 B1 | 7/2003 | Ginsburg et al. |
| 7,062,470 B2 | 6/2006 | Prasad et al. |
| 7,328,455 B2 * | 2/2008 | Jutzi .................... H04N 7/1675 348/E5.004 |
| 7,340,773 B2 | 3/2008 | Edwards |
| 7,624,437 B1 | 11/2009 | Fagundo et al. |
| 7,849,321 B2 | 12/2010 | Mizrah |
| 8,006,300 B2 | 8/2011 | Mizrah |
| 8,316,237 B1 * | 11/2012 | Felsher ................ H04L 9/0825 380/282 |

(Continued)

FOREIGN PATENT DOCUMENTS

| | | |
|---|---|---|
| WO | WO 99/64995 A1 | 12/1999 |
| WO | WO 01/11817 A2 | 2/2001 |
| WO | WO 2013/142802 A1 | 9/2013 |

OTHER PUBLICATIONS

U.S. Appl. No. 14/536,334, filed Nov. 7, 2014, Hughes.

(Continued)

*Primary Examiner* — Jason Lee
(74) *Attorney, Agent, or Firm* — Mauriel Kapouytian Woods LLP; Elaine Lee; Michael Mauriel

(57) ABSTRACT

Methods and systems for device notarization and verification are provided. In one implementation, various integrity values are concatenated to generate a concatenated value that is used to generate a transaction data signature (TDS). In one implementation, the concatenated value is a concatenation of a device value, an application value, an application encryption (AE) module value, and an authentication generation (AG) module value. The TDS or notarization code is generated by applying the concatenated value to the AG module. In one implementation, subsequent use of the application on the device involves generation of a new TDS, which is compared against the notarization code to determine whether use of the application on the device is authorized. In one implementation, the AE module and the AG module are seeded with a seed value which includes a device value, an application value, a user specific value, and a pseudo random number.

18 Claims, 8 Drawing Sheets

(56) References Cited

U.S. PATENT DOCUMENTS

| | | | |
|---|---|---|---|
| 8,347,097 B2 * | 1/2013 | Lapstun | G06F 3/03545 |
| | | | 235/425 |
| 8,433,914 B1 | 4/2013 | Philpott et al. | |
| 8,478,688 B1 | 7/2013 | Villa et al. | |
| 8,549,301 B2 | 10/2013 | Tornqvist | |
| 8,572,391 B2 | 10/2013 | Golan et al. | |
| 8,584,219 B1 | 11/2013 | Toole et al. | |
| 8,635,662 B2 | 1/2014 | Lang | |
| 8,763,100 B2 * | 6/2014 | Tie | H04L 9/3213 |
| | | | 380/46 |
| 2005/0097320 A1 | 5/2005 | Golan et al. | |
| 2006/0095763 A1 | 5/2006 | Iyengar et al. | |
| 2007/0250923 A1 | 10/2007 | M'Raihi | |
| 2008/0222368 A1 | 9/2008 | Gehrmann | |
| 2008/0263652 A1 | 10/2008 | McMurtry et al. | |
| 2008/0301784 A1 | 12/2008 | Zhu et al. | |
| 2009/0129594 A1 * | 5/2009 | Weissman | H04L 63/0442 |
| | | | 380/255 |
| 2011/0087888 A1 | 4/2011 | Rennie | |
| 2011/0258452 A1 | 10/2011 | Coulier et al. | |
| 2012/0089742 A1 | 4/2012 | Jagannatharao et al. | |
| 2012/0196674 A1 | 8/2012 | Gazdic et al. | |
| 2013/0167211 A1 | 6/2013 | Kamat | |
| 2013/0268753 A1 * | 10/2013 | Vanderpol | H04L 63/123 |
| | | | 713/155 |
| 2014/0283146 A1 * | 9/2014 | Obukhov | G06F 21/78 |
| | | | 726/34 |

OTHER PUBLICATIONS

Sanchez et al., "Implementing Signatures for Transactional Memory," 40th Annual IEEE/ACM Symposium on Microarchitecture (MICRO-40), 2007, pp. 1-11.

"CitiBusiness Online Token Reference Guide," Citigroup Inc., 2011, pp. 1-5.

\* cited by examiner

DEVICE NOTARIZATION

CROSS-REFERENCE TO RELATED APPLICATIONS

This application incorporates by reference, in its entirety, U.S. patent application Ser. No. 14/536,334 of Alexander Z. Hughes, filed on the same date as this application, titled "Nodal Random Authentication," and related to this application by subject matter.

BACKGROUND

Information security is of critical importance for many entities. This is particularly true for entities that deal with sensitive information, e.g., healthcare information. Information security for an entity may involve determining device integrity, application integrity and user authentication for accessing systems (e.g., network systems) of the entity. This helps increase the likelihood (1) that the device and application used for accessing the network system have not been tampered with in an unacceptable manner (e.g., in a manner that might threaten the network system) and (2) that the person accessing the network system is an authorized user. Ensuring information security becomes more challenging as users are provided with the flexibility of accessing network systems using a variety of different devices.

SUMMARY

Embodiments of the present invention are intended to address the need for greater assurance of device and application integrity and user authentication.

In one implementation, embodiments of the present invention concatenate various integrity values to generate a concatenated value that is used to generate a transaction data signature (TDS). In one specific implementation, the concatenated value is a concatenation of a device integrity value and an application integrity value. In yet another specific implementation, the concatenated value is a concatenation of a device integrity value, an application integrity value, an application encryption (AE) module value, and an authentication generation (AG) module value. The TDS generated the first time a device uses an application is herein referred to as a notarization code. The notarization code is used as a reference for the initial state of the device, which may also herein be referred to as the pristine state of the device. In one implementation, subsequent use of the application on the device involves generation of a new TDS, which is compared against the notarization code to determine whether use of the application on the device is authorized.

Also, in one implementation, a seed value is added to the AE module and the AG module, where the seed value includes a device integrity value, an application integrity value, a user specific value, and a pseudo random number.

BRIEF DESCRIPTION OF THE DRAWINGS

The novel features of the invention are set forth in the appended claims. However, for purpose of explanation, several aspects of particular embodiments of the invention are described by reference to the following figures.

DETAILED DESCRIPTION

The following description is presented to enable any person skilled in the art to make and use embodiments of the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
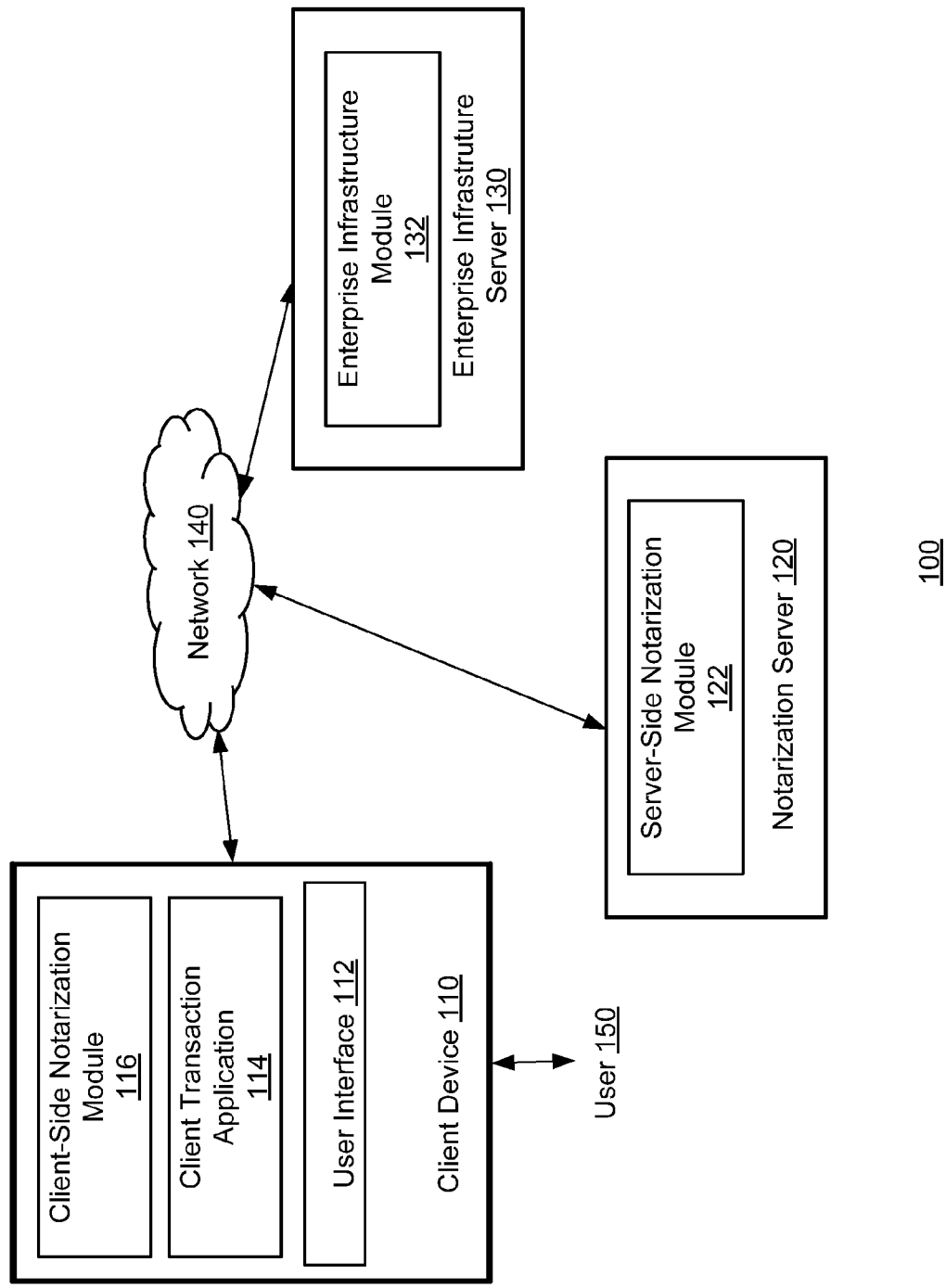
FIG. 1 illustrates a system according an embodiment of the present invention.

FIG. 1 illustrates a system 100 according an embodiment of the present invention. System 100 includes client device 110, notarization server 120, and enterprise infrastructure server 130 in communication over network 140. Although, in the interest of simplicity, only one client device is shown in FIG. 1, a system, such as system 100, would normally include many client devices. Similarly, system 100 may include multiple notarization and enterprise infrastructure servers. User 150 (e.g., a retail consumer, a medical patient, or medical doctor) utilizes client device 110 to initiate a transaction within system 100. Note that transaction, as used herein, refers to any suitable action performed using client transaction application 114 on client device 110, including payments, transfer of information, display of information, new user registration, requesting a prescription, filling a prescription, etc.

Notarization server 120 and enterprise infrastructure server 130 communicate with client device 110 via network 140 and may employ protocols such as Internet protocol suite (i.e., Transmission Control Protocol (TCP)/Internet Protocol (IP)), Hypertext Transfer Protocol (HTTP), Hypertext Transfer Protocol Secure (HTTPS), instant-messaging protocols, or other protocols. Network 140 may be implemented as a single network or a combination of multiple networks. For example, in various embodiments, network 140 may include the Internet or one or more intranets, landline networks, cellular networks, wireless networks, and/or other appropriate types of networks.

Client device 110 may be implemented using any appropriate hardware and software configured for wired and/or wireless communication over network 140. For example, in one embodiment, client device 110 may be implemented as a personal computer (PC), a tablet, personal digital assistant (PDA), laptop computer, a smart phone, an automated teller machine, and/or other types of computing devices capable of transmitting and/or receiving data over network 140.

Client device 110 includes user interface 112, client transaction application 114, and client-side notarization module 116. User interface 112 may have associated there-with a browser application. The browser application may be used, for example, to provide a convenient interface to permit a user to browse information available over network 140. For example, in one embodiment, the browser application may be implemented as a web browser configured to view information available over the Internet. Operation of client-side notarization module 116 is discussed further with reference to FIGS. 3, 4, 6, and 7. In one embodiment, client-side notarization module 114 includes modules or code run at the client device during the notarization or verification methods of FIGS. 3, 4, 6, and 7. In one embodiment, client-side notarization module 114 includes the device tamper (DT) check module, the application tamper (AT) check module, the AE module, and the AG module. As explained below, in one embodiment, client-side notarization module 116 is downloaded from notarization server 120 via network 140. Similarly, as explained below, in one embodiment, client transaction application 114 is downloaded from enterprise infrastructure server 130. Client transaction application 114 may be used, for example, to provide client-side processing for performing desired tasks or transactions in response to operations selected by user 150.

For example, with respect to financial transactions, client transaction application 114 may be a payment application configured to display a user interface in connection with a financial transaction initiated by a user. As another example, in the health care environment, client transaction application 114 may be configured to display a user interface in connection with a medical transaction initiated by a user. For example, the medical transaction may involve a patient looking up test results, a patient requesting prescriptions, a medical doctor filling prescriptions, etc.

Notarization server 120 includes server-side notarization module 122. As explained below, server-side notarization module 122 is used to notarize client device 110. As used herein notarization refers to both (1) notarizing client device 110 when client device first downloads and use client transaction application 114 and (2) verifying that client device 110 is an authorized device when user 150 subsequently uses client transaction application 114. Operation of server-side notarization module 122 is discussed further with reference to FIGS. 3, 5, 6, and 8. In one embodiment, server-side notarization module 122 includes modules or code run at the notarization server during the notarization or verification methods of FIGS. 3, 5, 6, and 8. In one embodiment, server-side notarization module 122 includes (1) the module or code for appending a specific identification (ID) to the application, (2) the module or code for seeding, registering and providing AE and AG modules to the client device, (3) the AG module and (4) the module or code for comparing notarization codes/TDSs.

Enterprise infrastructure server 130 includes enterprise infrastructure module 132. Operation of enterprise infrastructure module 132 is discussed further with reference to FIGS. 3, 5, 6, and 8. As explained below, enterprise infrastructure module 132 is used to provide client transaction application 114 to the client device and to verify the identity of the user. In one embodiment, enterprise infrastructure module 132 further includes an AT check module and a module or code for appending the application value to client transaction application 114.

In FIG. 1, notarization server 120 and enterprise infrastructure server 130 are shown as being separate servers. In an alternative embodiment, they may be shown as one server having the combined relevant features and functionalities of the two separate servers. Such a combined server may herein also be referred to as a notarization server.

Figure 2:
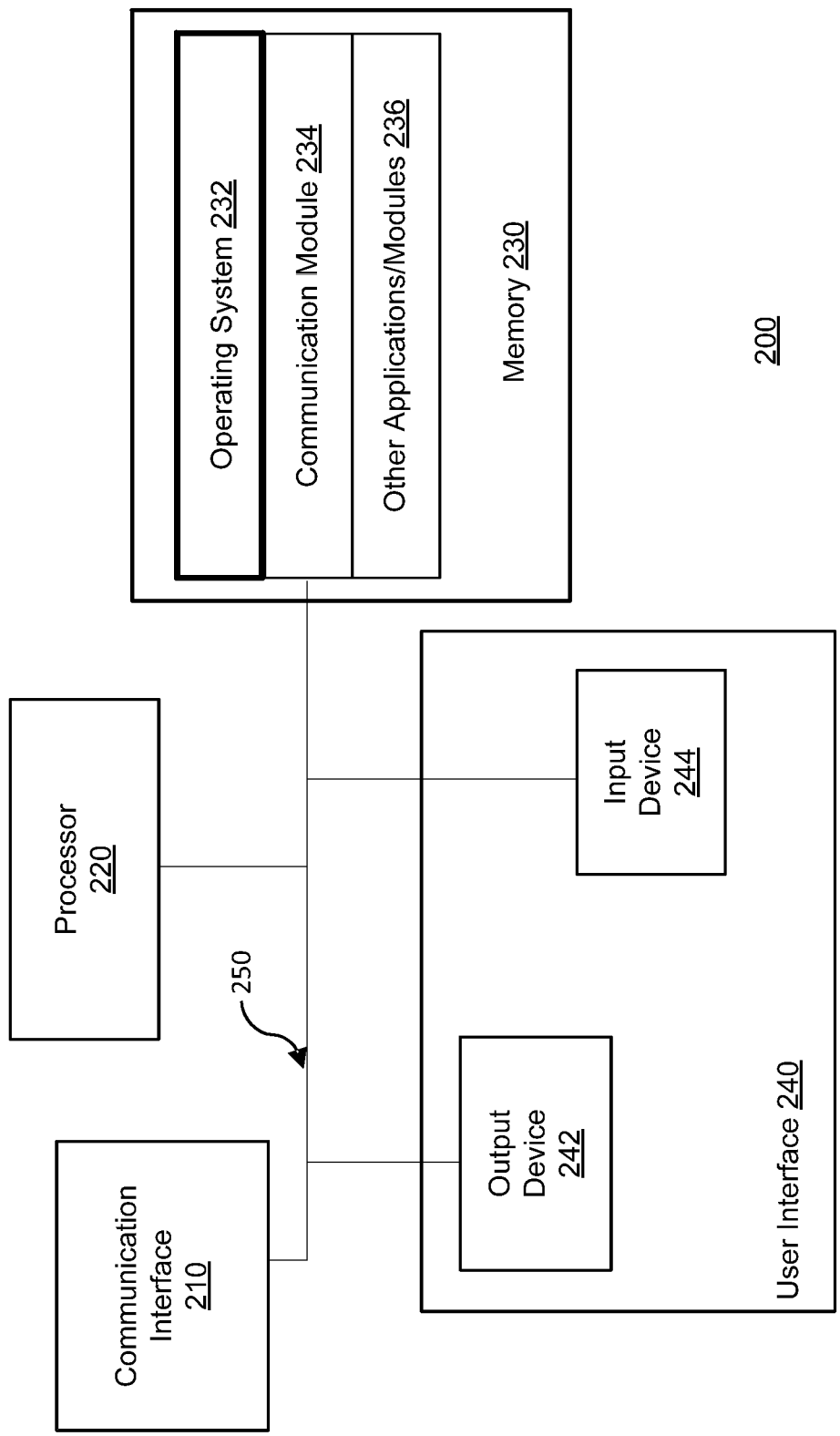
FIG. 2 is a block diagram of an exemplary computing device used in the system of the present invention.

FIG. 2 is a block diagram of an exemplary computing device 200 in accordance with some embodiments of the present invention, which can be used as any one of client device 110, notarization server 120, and enterprise infrastructure server 130. In one embodiment computing device 200 typically includes one or more communications interfaces 210 (e.g., network interfaces), one or more processors 220 (which may be central processing units (CPUs)), memory 230, user interface 240, and one or more communication buses 250 for interconnecting these components. Communication buses 250 may include circuitry (sometimes called a chipset) that interconnects and controls communications between system components.

User interface 240 includes output device 242 (e.g., display) and input device 244 (e.g., keyboard, touch screen). In one embodiment, output device 242 and input device 244 may be the same device, e.g., a touch screen that serves as both an input device and a display.

Memory 230, or one or more of the storage devices (e.g., one or more non-volatile storage devices) in memory 230, includes a computer readable storage medium. In some embodiments, memory 230 or the computer readable storage medium of memory 230 stores the following programs, modules, and data structures, or a subset thereof: operating system 232, communication module 234, and other applications/modules 236. In one embodiment, operating system 232 includes procedures for handling various basic system services and for performing hardware dependent tasks. Also, in one embodiment, communication module 234 (e.g., a network communication module) is used for connecting computing device 200 to other computers via the one or more communication interfaces 210 and one or more communication networks, such as the Internet, other wide area networks, local area networks, metropolitan area networks, and so on. In case of client device 110, other applications/modules 236 may include a browser application (not shown), client transaction application 114 (shown in FIG. 1), client-side notarization module 116 (shown in FIG. 1), word processing application (not shown), etc. In case of notarization server 120, other applications/modules 236 may include server-side notarization module 122 (shown in FIG. 1). In case of enterprise infrastructure server 130, other applications/modules 236 may include enterprise infrastructure module 132 (shown in FIG. 1).

Memory 230 may include a high-speed random access memory, such as DRAM, SRAM, DDR RAM or other random access solid state memory devices. Memory 230 may also include non-volatile memory, such as one or more magnetic disk storage devices, optical disk storage devices, flash memory devices, or other non-volatile solid state storage devices. Although not illustrated, memory 230 may also include any data storage equipment accessible by computing device 200, such as any memory that is removable or portable, (e.g., flash memory or external hard disk drives), or any data storage hosted by a third party (e.g., cloud storage), and is not limited thereto.

As noted above, memory 230 is a computer readable medium, more specifically a tangible computer readable medium. Computer programs on memory 230, when executed on computing device(s) or computer(s), cause the computing device(s) or computer(s) to perform embodiments of the methods of the present invention. Computer programs may also be referred to by various other names, such as, for example, applications, application program code, computer applications, computer program applications, computer program modules, computer program code, computer program instructions, computer readable code, computer executable code, applet interpreters or compilers, virtual machines, etc. In one embodiment, the computer readable medium can be distributed over a network-coupled computer system so that the computer readable code is stored and executed in a distributed fashion. It is to be noted that any or all steps of the embodiments of the methods of the present invention can be computer implemented. It is also to be noted that the above examples of computer readable media are examples of non-transitory computer readable media. Further, computer instruction signals may be embodied in a transmission medium (with or without a carrier wave upon which the signals are modulated). For example, the transmission medium may include a communications network, such as the Internet.

It is to be noted that computing device 200 is only exemplary and a large variety of computer configurations may be suitable for implementing embodiments of the present invention. Furthermore, it is to be noted that computing device 200 illustrated in FIG. 2 is a simplified version of a computing device. Accordingly, some details of computing device 200 that are known in the art have been left out of FIG. 1 so as not to unduly overcomplicate the drawing.

Figure 3:
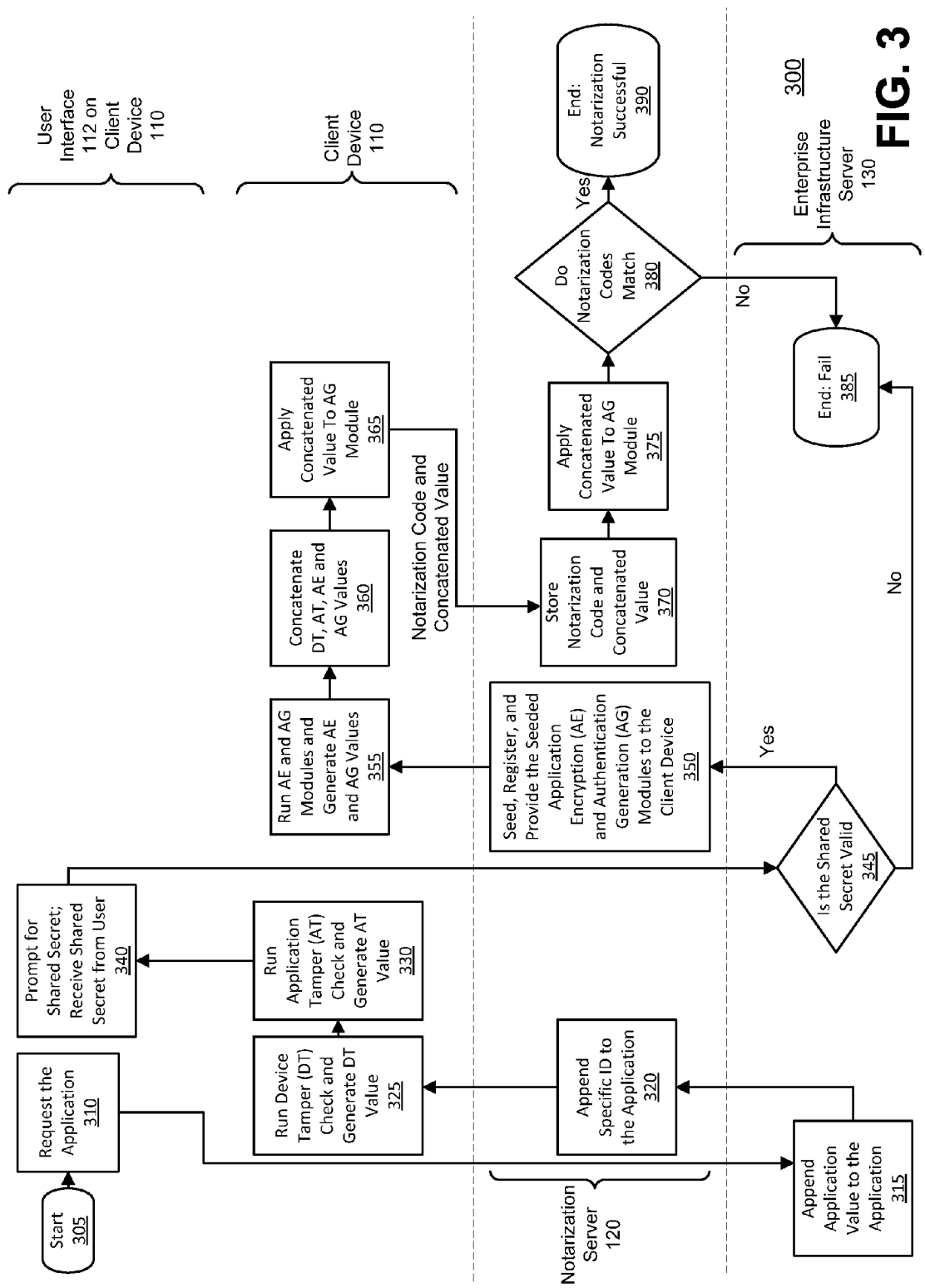
FIG. 3 is cross-functional flowchart of an embodiment of a method of device notarization of the present invention.

FIG. 3 is cross-functional flowchart of an embodiment of a method of device notarization of the present invention. Method 300 of FIG. 3 illustrates actions at user interface 112, client device 110, notarization server 120, and enterprise infrastructure server 130, all of which are shown in FIG. 1. Method 300 is for notarization of a client device the first time the client device downloads a particular application. More specifically, method 300 notarizes a reference state (also herein referred to as a pristine state) of the client device.

Method 300 starts at 305. At 310, by way of user interface 112, a request for an application is issued. It is to be noted that, alternatively, the request for the application, which originates from user 150, may be viewed as being issued by client device 110. In one embodiment, the application is a client transaction application, such as client transaction application 114. The request for the application is received by the enterprise infrastructure server 130. At 315, the enterprise infrastructure server 130 appends an application value to the application and sends it to the notarization server 120. In one embodiment, the application value represents the result of an AT check and provides details as to how and why the AT check was passed by the application. In one embodiment, the AT check determines whether the application is in an acceptable state. More specifically, in one embodiment, the AT check determines whether the application has been modified in an unacceptable way. In one embodiment, the AT check is performed using the GuardIT/EnsureIT anti-tamper software available from Arxan Technologies of Bethesda, Md. In one implementation, the application value is a hash value of the result of the AT check. At 320, notarization server 120 appends a specific ID to the application. In one embodiment, the specific ID is a serial number of the application copy or issue to be forwarded to client device 110. Thereafter, notarization server 120 sends the application to client device 110.

At 325, client device 110, which received the application, runs a DT check on the client device and generates a DT value. In one embodiment, the DT check determines whether the client device is in an acceptable state. More specifically, in one embodiment, the DT check determines whether the user has access to any unauthorized processes (i.e., processes to which the user should not have access on the client device) and detects malware on the client device. For example, DT check determines whether the client device is swizzled or jailbroken (e.g., where some limitation(s) on the operating system (OS) of the client device have been removed, thereby likely escalating or increasing user privileges on the client device). In one embodiment, the DT check is performed using the DIGIPASS®/VACMAN controller, available from VASCO Data Security International, Inc. of Chicago, Ill. In another embodiment, the DT check is performed using the EnsureIT DT check software available from Arxan Technologies of Bethesda, Md. In one embodiment, the DT value represents the result of the DT check and provides details as to how and why the DT check was passed by the client device. In one implementation, the DT value is a hash value of the result of the DT check.

At 330, client device 110 runs an AT check on the application and generates an AT value. In one embodiment, the AT check determines whether the application is in an acceptable state. More specifically, in one embodiment, the AT check determines whether the application has been modified in an unacceptable way. In one embodiment, the AT check is performed using the GuardIT/EnsureIT anti-tamper software available from Arxan Technologies of Bethesda, Md. In one embodiment, the AT value represents the result of the AT check and provides details as to how and why the AT check was passed by the application. In one implementation, the AT value is a hash value of the result of the AT check.

Thereafter, at 340, user interface 112 prompts the user for a shared secret and receives the shared secret from the user. The shared secret may include a user ID (e.g., a user's name or driver license number) and a password. At 345, enterprise infrastructure server 130 determines whether the shared secret is valid. If the shared secret is not valid, then the method ends at 385 indicating that there was a failure in the notarization process. If on the other hand, the shared secret is determined to be valid, then the method proceeds to 350. In one embodiment, during the initial downloading of the application, instead of providing a shared secret, the user can claim an identity, i.e., claim a username and create a password, which serve the function of a shared secret. At 345, enterprise infrastructure server 130 also optionally prompts the user to create an application password for accessing the application. In one embodiment, the application password may be a personal identification number (PIN), a gesture-based password (e.g., a hand gesture) or some other shared secret. In one embodiment, the gesture-based password can be encrypted into a numeric value. In one embodiment, the gesture-based password module used is the Fixmo® Secure Gesture available from Fixmo, Inc. of Toronto, Canada.

In an alternative embodiment, the prompting for a shared secret and determination of whether the received shared secret is valid occurs earlier in method 300 than shown in FIG. 3. For example, in one embodiment, step 340 may immediately follow step 310. In other words, when the request for the application is received, the user interface prompts the user to provide a shared secret. In such an alternative embodiment, thereafter the method would proceed to step 345, and from there the method would proceed to either step 385 or step 315.

At 350, notarization server 120 (1) seeds an application encryption (AE) module and an authentication generation (AG) module, (2) registers the seeded AE and AG modules to client device 110, and (3) provides the seeded AE and AG modules to client device 110. In one embodiment, the AE and AG modules are seeded with a client device value, an application value, a user specific value, and a pseudo random value. In one embodiment, the client device value is the DT value. Also, in one embodiment, the application value is the AT value. Also, in one embodiment, the user specific value is the user's National User ID (NUID), the user's driver license number, the user's social security number, the user's birth date, etc. In one embodiment, the seed value is a hash seed value.

At 355, client device 110 runs the AE and AG modules and generates AE and AG values. In one embodiment, the AE value represents the result of running the AE module at the client device, whereas the AG value represents the result of running the AG module at the client device. In one embodiment, the AE and AG values are hash values of the AE and AG results, respectively.

In one embodiment, the AE module includes a seed value (which makes the AE module specific to a given user on a given device running a given application) and an encryption algorithm (which is identical across instances of the AE module). Similarly, in one embodiment, the AG module includes a seed value (which makes the AG module specific to a given user on a given device running a given application) and subroutines for running checks (which are identical across instances of the AG module) and subroutines for performing operational changes (which are identical across instances of the AG module). In one embodiment, the subroutines for running checks (e.g., checksum) are for ensuring that the computer application program structure and function have not been altered. Also, in one embodiment, the subroutines for performing operational changes are for dynamically changing the computer application program code between its stored state in memory and its active state during runtime. In other words, in one embodiment, the subroutines for performing operational changes are applied to segments of the runtime code of the computer application program code. In one embodiment, at notarization, the running of the modules involved in notarization (e.g., the DT check, AT check, AE, and AG modules) confirms that those modules are present, operational, and unaltered (i.e., factory settings are in place).

In one embodiment, the AE module performs encryption using advanced encryption standard (AES) 256 bits or better. In one embodiment, the AE module is used to encrypt data at the client device. In one embodiment, the AE module encrypts in-flight data (e.g., data submitted by the user to the application program) and at-rest data (e.g., data that is persisted on the client device). In one embodiment, the AE module encrypts all in-flight data and at-rest data.

In one embodiment, the AG module is a two factor authentication generation (2FA G) module. In another embodiment, the AG module may be a one factor authentication generation (1FA G) module or a three factor authentication generation (3FA G) module. As explained above, the AG module is used at the client device to generate a transaction data signature (TDS). Also, in one embodiment, the AG module is used for instantiation of the client transaction application at runtime, retirement of the client transaction application to memory, and at execution of critical subroutines or nodes of the client transaction application. The critical subroutines or nodes may also herein be referred to as guarded or protected subroutines or nodes.

At 360, client device 110 concatenates the DT, AT, AE, and AG values together to form a concatenated value. In an alternative embodiment, client device 110 concatenates the DT and AT values. At 365, the concatenated value is applied to the AG module to generate a TDS. The first instance of the TDS generated at a client device for an application, i.e., the first TDS generated by a client device for a particular application is herein also referred to as a notarization code. Client device 110 then sends the notarization code and the concatenated value to notarization server 120.

At 370, notarization server 120 stores the notarization code and the concatenated value. At 375, notarization server 120 applies the concatenated value to the AG module to generate a TDS. The AG module used is that registered to the client device. The first instance of a TDS generated at a notarization server for a particular client device and application is herein also referred to as a notarization code. At 380, notarization server 130 compares (1) the notarization code it received from client device 110 and (2) the notarization code that it generated using the AG module registered to the client device. If these notarization codes do not match, then the method ends at 385 indicating that there was a failure in the notarization process. On the other hand, if the notarization codes match, then method 300 ends at 390 indicating that the notarization is successfully completed. As a result, the user is allowed to use the application on client device 110.

Figure 4:
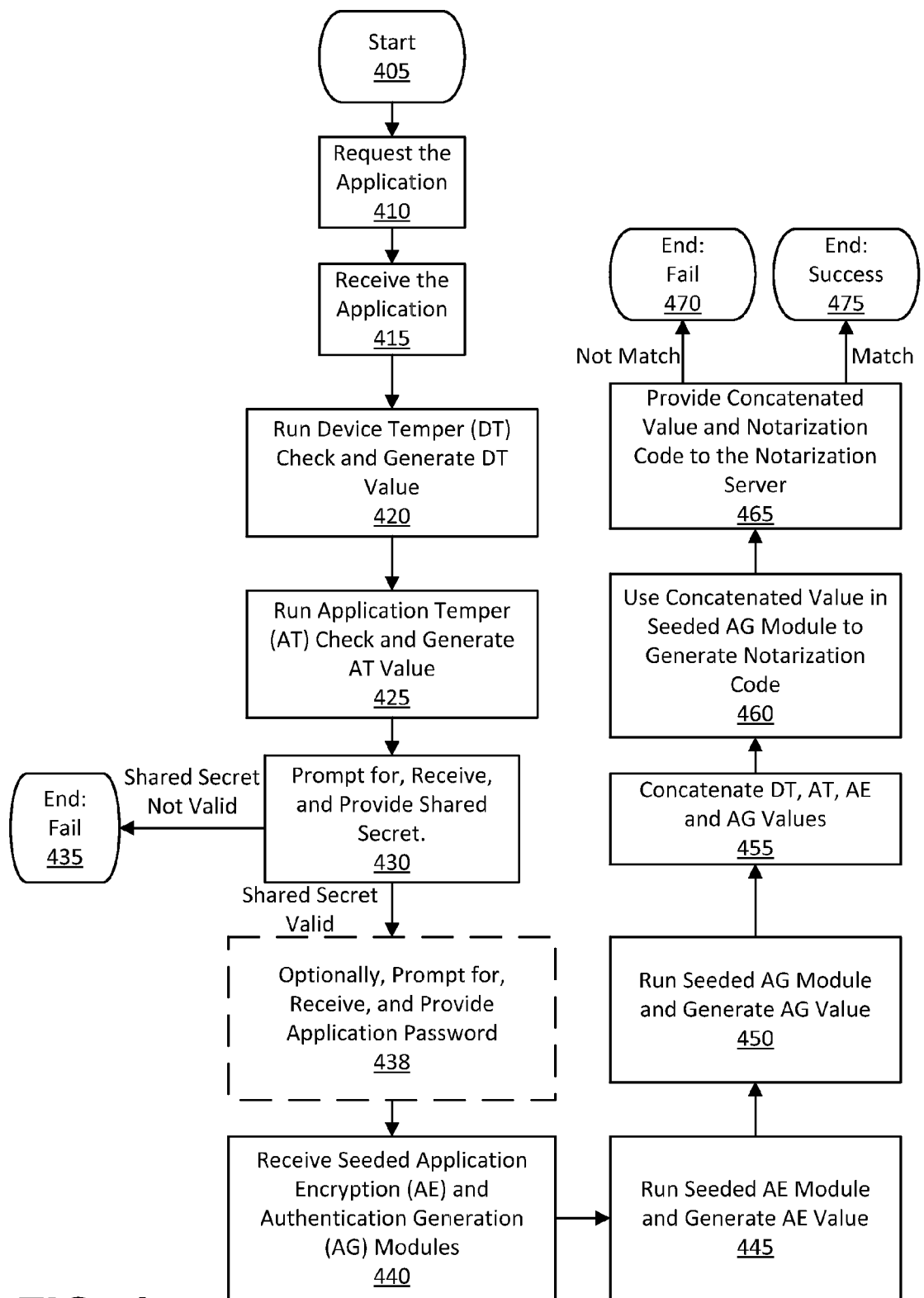
FIG. 4 is a flowchart illustrating in more detail the portion of the method shown in FIG. 3 performed at the client end.

FIG. 4 is a flowchart illustrating in more detail the portion of method 300 (shown in FIG. 3) performed at the client end, i.e., by the user, user interface 112 and client device 110. As user interface 112 is at client device 110, steps performed by user interface 112 and client device 110 may be collectively referred to as being performed by client device 110.

In FIG. 4, method 400 starts at 405. At 410, by way of user interface 112, client device 110 requests an application, which as noted above, in one embodiment, is a client transaction application. At 415, client device 110 receives the application. At 420, client device 110 runs a DT check on client device 110 and generates a DT value, which in one embodiment is a hash value of the result of running the DT check. At 425, client device 110 runs an AT check on the application and generates an AT value, which in one embodiment is a hash value of the result of running the AT check.

At 430, user interface 112 prompts for and receives a shared secret from the user. Also, at 430, client device 110 provides the shared secret to enterprise infrastructure server 130. If the shared secret is determined to be invalid by enterprise infrastructure server 130, method 400 ends at 435 indicating that there was a failure in the notarization process. If, on the other hand, the shared secret is determined to be valid, then the method proceeds to 440.

In one embodiment, prior to proceeding to 440, method 400 first proceeds to the optional step 438. At 438, user interface 112 prompts for and receives an application password from the user. Also, at 438, client device 110 provides the application password to enterprise infrastructure server 130. As noted above, in one embodiment, the application password may be a PIN, a gesture-based password (e.g., a hand gesture) or some other shared secret.

At 440, client device 110 receives a seeded AE module and a seeded AG module, both of which are registered to client device 110. As noted above, in one embodiment, the AE and AG modules are seeded with a client device value, an application value, a user specific value, and a pseudo random value. At 445, client device 110 runs the seeded AE module and generates an AE value, which in one embodiment, may be a hash value. At 450, client device 110 runs the seeded AG module and generates an AG value, which in one embodiment, may be a hash value. At 455, client device 110 concatenates the DT, AT, AE, and AG values together to form a concatenated value. At 460, the concatenated value is applied to the seeded AG module to generate a TDS. As explained above, the first instance of the TDS generated at a client device for an application is herein also referred to as a notarization code. At 465, client device 110 provides/sends the notarization code and the concatenated value to notarization server 120. If these notarization codes generated at client device 110 and notarization server 120 do not match, as determined by notarization server 120, then the method ends at 470 indicating that there was a failure in the notarization process. On the other hand, if the notarization codes match, as determined by notarization server 120, then the method ends at 475 indicating that the notarization is successfully completed.

Figure 5:
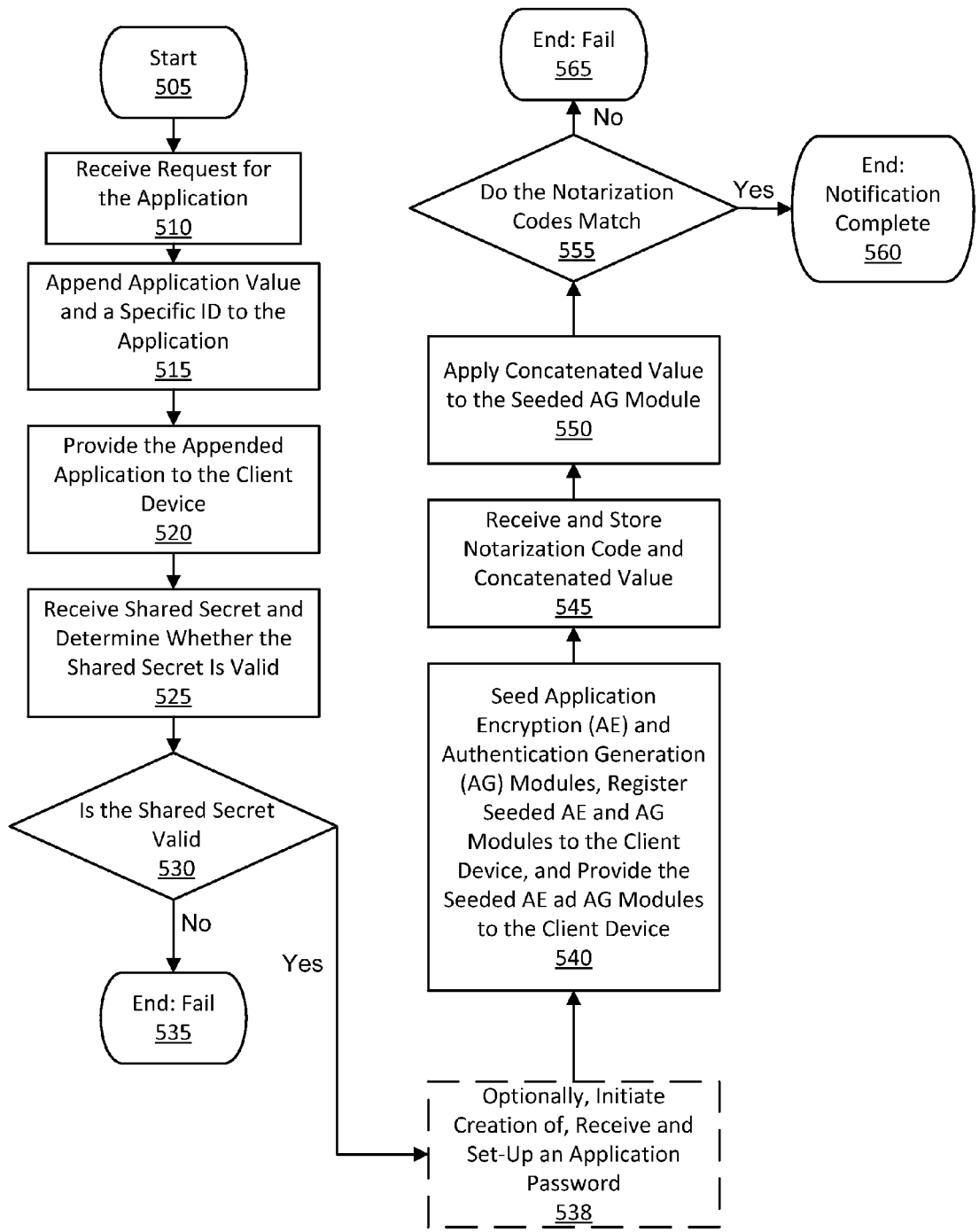
FIG. 5 is a flowchart illustrating in more detail the portion of the method shown in FIG. 3 performed at the server end.

FIG. 5 is a flowchart illustrating in more detail the portion of method 300 (shown in FIG. 3) performed at the server end, i.e., by notarization server 120 and enterprise infrastructure server 130.

In FIG. 5, method 500 starts at 505. At 510, enterprise infrastructure server 130 receives a request for the application. At 515, enterprise infrastructure server 130 appends an application value to the application and notarization server 120 appends a specific ID to the application. At 520, notarization server 120 provides the appended application to client device 110. In an alternative embodiment, appending both an application value and a specific ID to the application may be performed by enterprise infrastructure server 130.

At 525, enterprise infrastructure server 130 receives a shared secret from client device 110 and determines whether the shared secret is valid. If the shared secret is not valid, then the method ends at 535 indicating that there was a failure in the notarization process. If, on the other hand, the shared secret is determined to be valid, then the method proceeds to 540.

In one embodiment, prior to proceeding to 540, method 500 first proceeds to the optional step 538. At 538, enterprise infrastructure server 130 initiates the creation of an application password, by causing the client device to prompt the user to create an application password. Also, at 538, enterprise infrastructure server 130 receives and sets up an application password. The next time a shared secret needs to be used in conjunction with use of the application at the client device, the application password would be used as the shared secret.

At 540, the notarization server 120 (1) seeds an AE module and an AG module, (2) registers the seeded AE and AG modules to client device 110, and (3) provides the seeded AE and AG modules to client device 110. As noted above, in one embodiment, the AE and AG modules are seeded with a client device value, an application value, a user specific value, and a pseudo random value.

At 545, notarization server 120 receives and stores a notarization code and a concatenated value from client device 110. At 550, notarization server 120 applies the concatenated value to the seeded AG module (registered to client device 110) to generate a notarization code. At 555, notarization server 130 compares (1) the notarization code it received from client device 110 and (2) the notarization code that it generated using the seeded AG module registered to client device 110. If these notarization codes do not match, then the method ends at 565 indicating that there was a failure in the notarization process. On the other hand, if the notarization codes match, then the method ends at 560 indicating that the notarization is successfully completed. As a result, the user is allowed to use the application on client device 110.

Figure 6:
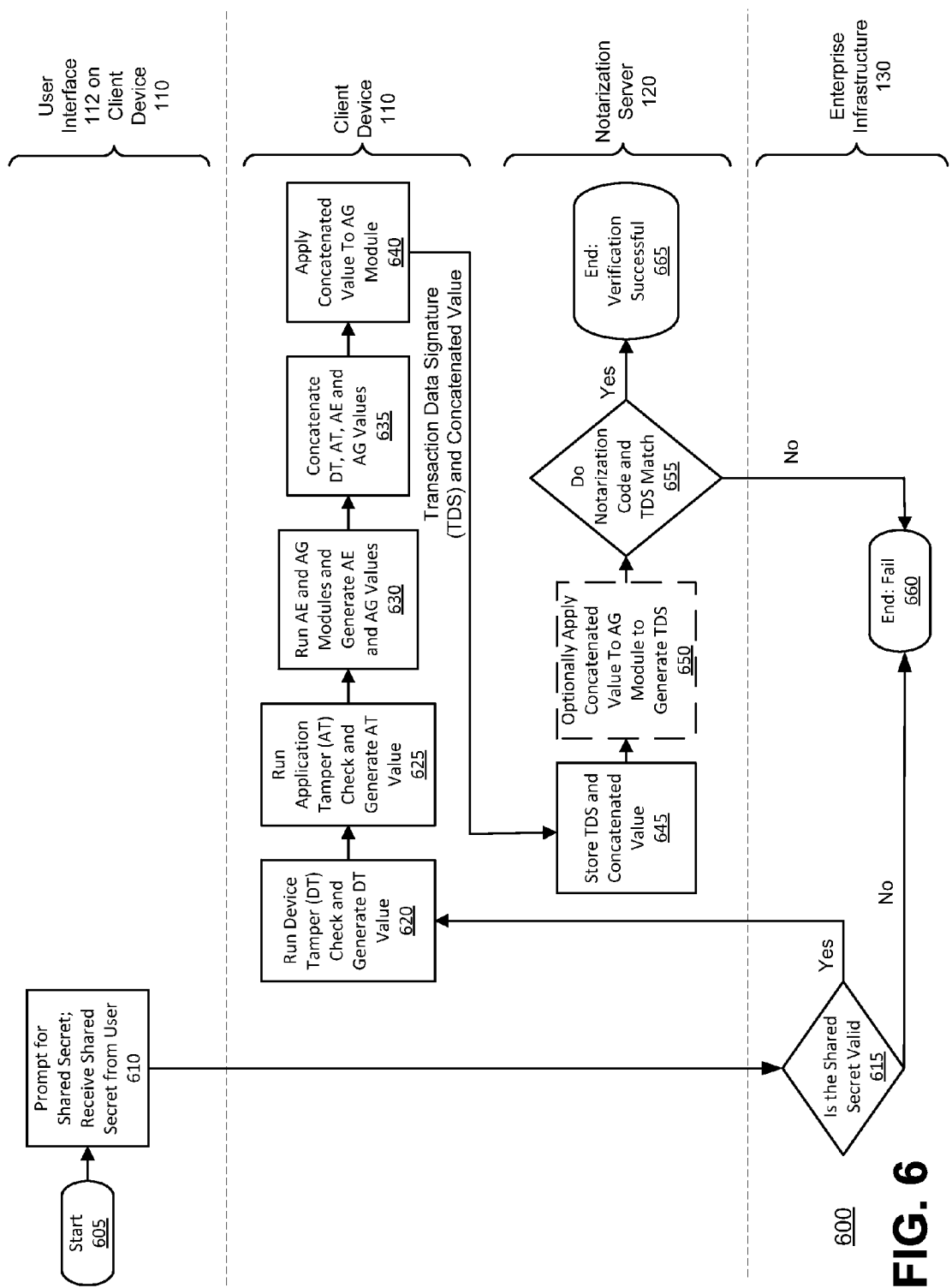
FIG. 6 is cross-functional flowchart of an embodiment of a method of TDS verification of the present invention for a notarized client device.

FIG. 6 is cross-functional flowchart of an embodiment of a method of TDS verification of the present invention for a notarized client device. In other words, such verification is for a client device that has already been notarized using method 300 (shown in FIG. 3). After the notarization of method 300 (shown in FIG. 3), method 600 is used when the application (downloaded in method 300) is used at the client device. More specifically, method 600 is used at login into the application and optionally when a critical subroutine or node of the application is accessed (e.g., prescribing medication). In other words, method 600 verifies a post-reference state of the client device, the reference state being the state of the device at the notarization of method 300 (shown in FIG. 3), i.e., the pristine state. The TDS verification of method 600 may also herein be referred to as notarization, post-pristine-state notarization, or post-reference-state notarization.

Method 600 of FIG. 6 illustrates actions at user interface 112, client device 110, notarization server 120, and enterprise infrastructure server 130, all of which are shown in FIG. 1. Method 600 starts at 605. At 610, user interface 112 prompts the user for a shared secret and receives the shared secret from the user. At 615, enterprise infrastructure server 130 determines whether the shared secret is valid. If the shared secret is not valid, then the method ends at 660 indicating that there was a failure in the verification process. If, on the other hand, the shared secret is determined to be valid, then the method proceeds to 620. As explained above, the prompt for the shared secret may be due to user attempting to login into the application or when a critical subroutine or node of the application is accessed by the client device.

At 620, client device 110 runs a DT check on the client device and generates a DT value, which in one embodiment is a hash value of the result of running the DT check. At 625, client device 110, runs an AT check on the application and generates an AT value, which in one embodiment is a hash value of the result of running the AT check. At 630, client device 110 runs the AE and AG modules and generates AE and AG values, which, in one embodiment, may be hash values. At 635, client device 110 concatenates the DT, AT, AE, and AG values together to form a concatenated value. In an alternative embodiment, client device 110 concatenates the DT and AT values. At 640, the concatenated value is applied to the AG module to generate a TDS. Client device 110 then sends the TDS and the concatenated value to notarization server 120.

At 645, notarization server 120 stores the TDS and the concatenated value. At 650, notarization server 120 optionally applies the concatenated value to the AG module to generate a TDS. The AG module used is that registered to the client device. If notarization server 120 generates a TDS at 650, then that TDS is used at 655. On the other hand, if optional step 650 is not performed (i.e., if notarization server does not generate a TDS at 650), then the TDS received from client device 110 and stored at 645 is used at 655. At 655, notarization server 120 compares (1) the notarization code that notarization server 120 received from client device 110 in method 300 and (2) either (a) the TDS received from client device 110 or (b) the TDS that notarization server 120 generated at 650. If the notarization code and the TDS do not match, then the method ends at 660 indicating that there was a failure in the verification process. On the other hand, if the notarization code and the TDS match, then the method ends at 665 indicating that the verification is successfully completed.

Figure 7:
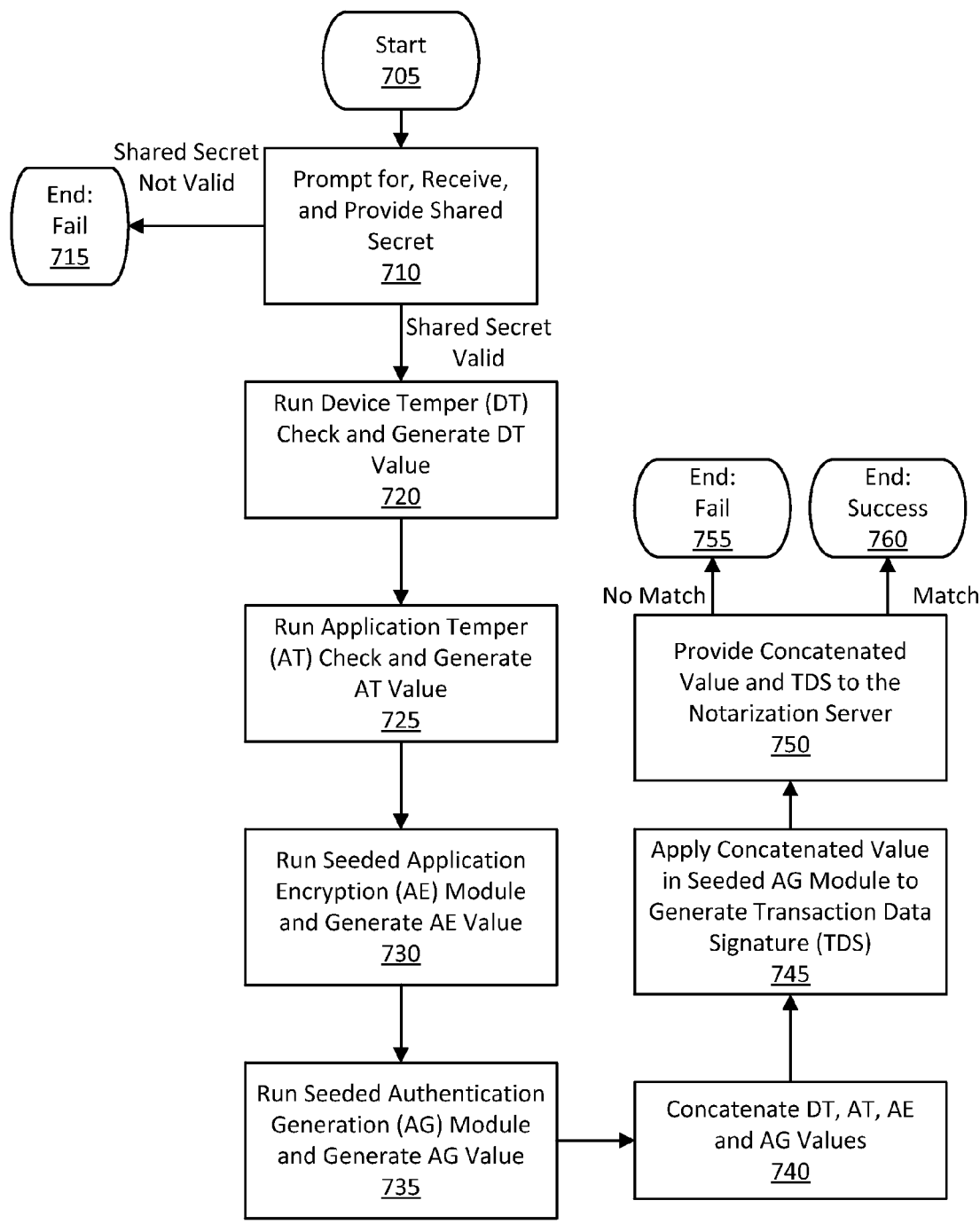
FIG. 7 is a flowchart illustrating in more detail the portion of the method shown in FIG. 6 performed at the client end.

FIG. 7 is a flowchart illustrating in more detail the portion of method 600 (shown in FIG. 6) performed at the client end, i.e., by the user, user interface 112 and client device 110. As user interface 112 is at client device 110, steps performed by user interface 112 and client device 110 may be collectively referred to as being performed by client device 110.

In FIG. 7, method 700 starts at 705. At 710, user interface 112 prompts for and receives a shared secret from the user. As explained above, the shared secret may be an application password instead of the initially set up shared secret. Also, at 710, client device 110 provides the shared secret to enterprise infrastructure server 130. If the shared secret is determined to be invalid by enterprise infrastructure server 130, method 700 ends at 715 indicating that there was a failure in the verification process. If, on the other hand, the shared secret is determined to be valid, then the method proceeds to 720.

At 720, client device 110 runs a DT check on client device 110 and generates a DT value, which, in one embodiment, is a hash value of the result of running the DT check. At 725, client device 110 runs an AT check on the application and generates an AT value, which, in one embodiment, is a hash value of the result of running the AT check.

At 730, client device 110 runs the seeded AE module, registered to client device 110, and generates an AE value, which, in one embodiment, may be a hash value. At 735, client device 110 runs the seeded AG module, registered to client device 110, and generates an AG value, which, in one embodiment, may be a hash value. At 740, client device 110 concatenates the DT, AT, AE, and AG values together to form a concatenated value. At 745, the concatenated value is applied to the seeded AG module to generate a TDS. At 750, client device 110 provides/sends the concatenated value and the TDS to notarization server 120. In one embodiment, if the notarization code generated at client device 110 (in method 300) and the TDS generated by client device 110 at 745 do not match, then the method ends at 755 indicating that there was a failure in the verification process. On the other hand, if they do match, as determined by notarization server 120, then the method ends at 760 indicating that the verification is successfully completed. In an alternative embodiment, if the notarization code generated at client device 110 (in method 300) and the TDS generated by notarization server 120 (using the concatenated value provide to notarization server at 750) do not match, then the method ends at 755 indicating that there was a failure in the verification process. On the other hand, if they do match, as determined by notarization server 120, then the method ends at 760 indicating that the verification is successfully completed.

Figure 8:
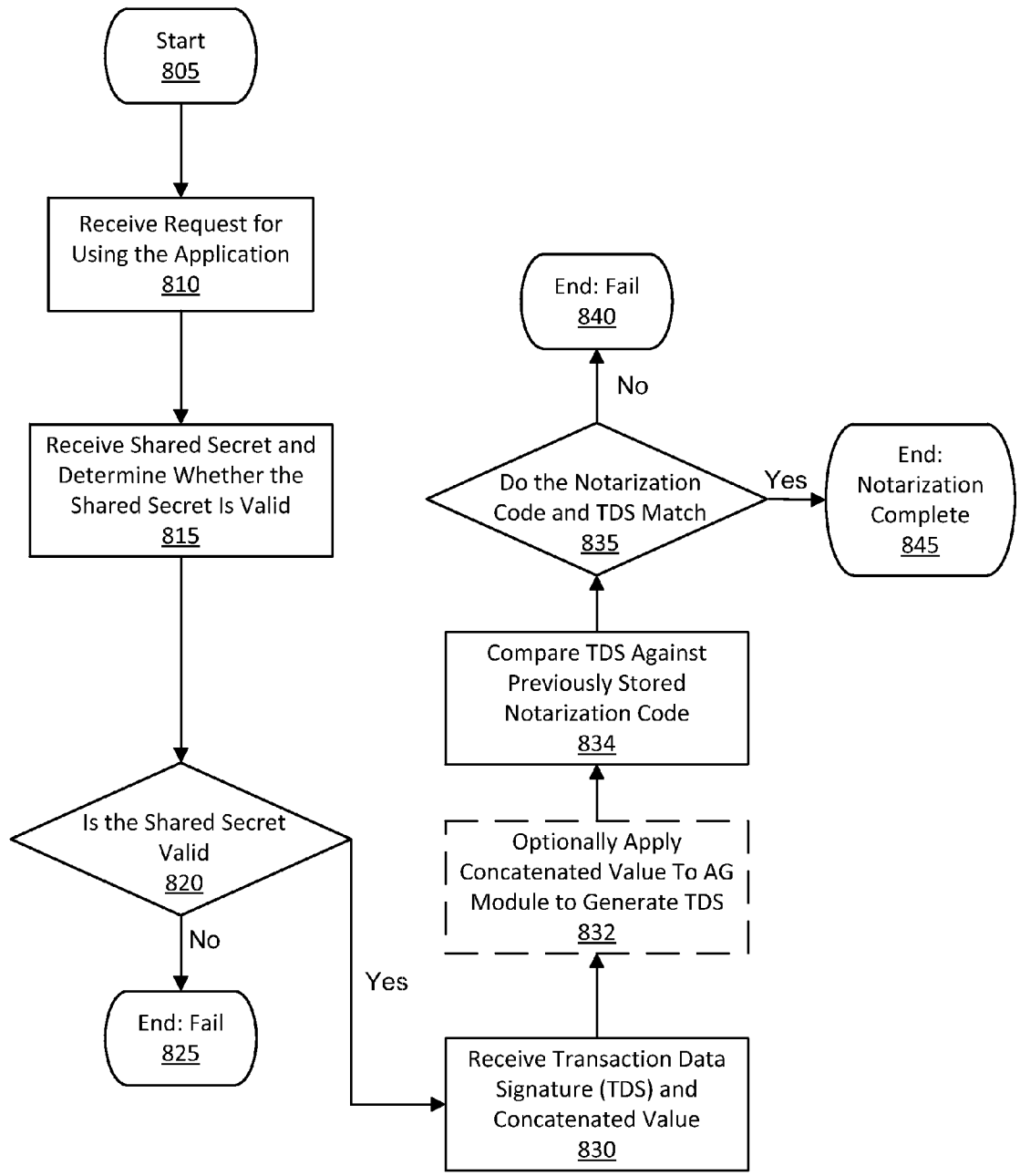
FIG. 8 is a flowchart illustrating in more detail the portion of the method shown in FIG. 6 performed at the server end.

FIG. 8 is a flowchart illustrating in more detail the portion of method 600 (shown in FIG. 6) performed at the server end, i.e., by notarization server 120 and enterprise infrastructure server 130.

In FIG. 8, method 800 starts at 805. At 810, enterprise infrastructure server 130 receives a request for using the application. At 815, enterprise infrastructure server 130 receives a shared secret from client device 110 and determines whether the shared secret is valid. As explained above, the shared secret may be an application password instead of the initially set up shared secret. At 820, if the shared secret is not valid, then the method ends at 825 indicating that there was a failure in the verification process. If, on the other hand, at 820, the shared secret is determined to be valid, then the method proceeds to 830.

At 830, notarization server 120 receives a TDS and a concatenated value from client device 110. At 832, notarization server 120 optionally applies the concatenated value to the seeded AG module (registered to client device 110) to generate a TDS. At 834, notarization server 120 compares (1) the notarization code that notarization server 120 received from client device 110 (in method 300) and (2) either (a) the TDS received from client device 110 at 830 or (b) the TDS that notarization server 120 generated at 832. At 835, if the notarization code and the TDS do not match, then the method ends at 840 indicating that there was a failure in the verification process. On the other hand, if they match at 835, then the method ends at 845 indicating that the verification process is successfully completed. As a result, the user is allowed to use the application on client device 110.

In one embodiment, after a first successful verification in method 600 (shown in FIG. 6) for a particular client device and a particular client transaction application, during a subsequent verification of method 600 for that particular client device and that particular client transaction application, transaction data in combination with some or all of DT, AT, AE, and AG values are concatenated to form a concatenated value. In one embodiment, this concatenated value is used to generate a TDS by the client device to verify a transaction. In such a case, in one embodiment, that same concatenated value is also used by the notarization server to generate a TDS. Thereafter the notarization server compares the TDS it generated against the TDS it received from the client device to verify the transaction. If the two TDSs match, then the transaction is verified. If the two TDSs do not match, then the transaction is not verified. In one embodiment, instead of using the entire transaction data to concatenate with some or all of the DT, AT, AE, and AG values, only a subset (that is less than the full set) of the transaction data is used to generate the concatenated value. In one embodiment, this subset is selected randomly, pseudo randomly, or non-randomly (i.e., deterministically). In one embodiment, the verification described above is used for critical, guarded, or protected transactions or for critical, guarded, or protected subroutines or nodes of transactions.

In one embodiment, after a first successful verification in method 600 (shown in FIG. 6) for a particular client device and a particular client transaction application, during a subsequent verification of method 600 for that particular client device and that particular client transaction application, instead of using the entire concatenated value (which may include some transaction data) in the AG module, less than the entire concatenated value is used to generate a TDS by the client device. In such a case, in one embodiment, that same less than entire concatenated value is also used by the notarization server to generate a TDS. Thereafter the notarization server compares the TDS it generated against the TDS it received from the client device. This comparison is used to verify the TDS from the client device. If the two TDSs match, then the TDS received from the client device is verified. If the two TDSs do not match, then the TDS received from the client device is not verified. In one embodiment, the subset (that is less than the full set) of the concatenated value that is used to generate the TDS is selected randomly, pseudo randomly, or non-randomly. In one embodiment, the verification described above is used to permit use of a client transaction application or to permit use of critical, guarded or protected subroutines or nodes of the client transaction application.

Also, in one embodiment, after a first successful verification in method 600 (shown in FIG. 6) for a particular client device and a particular client transaction application, transaction data for that particular client transaction application, without the DT, AT, AE, or AG value, may be used in the AG module to generate a TDS by the client device to verify a transaction. In such a case, in one embodiment, that same transaction data is also used by the notarization server to generate a TDS. Thereafter the notarization server compares the TDS it generated against the TDS it received from the client device to verify the transaction. If the two TDSs match, then the transaction is verified. If the two TDSs do not match, then the transaction is not verified. In one embodiment, a subset (that is less than the full set) of the transaction data is used to generate the TDS. In one embodiment, such a subset is selected randomly, pseudo randomly, or non-randomly. In one embodiment, the verification described above is used for critical, guarded or protected transactions or for critical, guarded or protected subroutines or nodes of transactions.

While the present invention has been particularly described with respect to the illustrated embodiments, it will be appreciated that various alterations, modifications, and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. A method comprising:
    generating a first concatenated value at a client device, during notarization of the client device to use an application, wherein the generating comprises concatenating a first device tamper (DT) value and a first application tamper (AT) value; and
    generating a first transaction data signature (TDS) at the client device, wherein the generating of the first TDS comprises applying the first concatenated value to an authentication generation (AG) module, wherein the first DT value is generated by running a DT check on the client device and the first AT value is generated by running an AT check on the application, and the first DT value and the first AT value each comprise a hash value.

2. The method of claim 1, wherein the generating of the first concatenated value further comprises concatenating an application encryption (AE) value and an AG value with the first DT value and the first AT value.

3. The method of claim 2, wherein the AE value is for an AE module that is seeded with the DT value, the AT value, a user specific value, and a pseudo random number, further wherein the AG value is for the AG module, wherein the AG module is seeded with the DT value, the AT value, the user specific value, and the pseudo random number.

4. The method of claim 3, wherein the AG module is a two factor authentication generation module.

5. The method of claim 1 further comprising:
    providing the first TDS and the first concatenated value to a notarization server.

6. The method of claim 1 further comprising:
    generating a second concatenated value at a client device, wherein the generating comprises concatenating a second DT value and a second AT value; and
    generating a second TDS at the client device, wherein the generating the second TDS comprises applying the second concatenated value to the AG module.

7. The method of claim 6 further comprising:
    providing the second TDS and the second concatenated value to a notarization server.

8. A method comprising:
    receiving a first transaction data signature (TDS) at a server, wherein the first TDS is generated during notarization of a client device to use an application at the client device by applying a first concatenated value to an authentication generation (AG) module, wherein the first concatenated value comprises a first device tamper (DT) value, a first application tamper (AT) value, a first application encryption (AE) value and a first AG value, wherein the DT and AT values each comprise a hash value;
    receiving the first concatenated value at the server;
    generating, at the server, a second TDS by using the first concatenated value; and
    comparing the first TDS and the second TDS.

9. The method of claim 8 further comprising:
    if the first TDS matches the second TDS, indicating that the client device is notarized; and
    if the first TDS does not match the second TDS, indicating that the client device is not notarized.

10. The method of claim 8 further comprising:
    receiving a third TDS at the server, wherein the third TDS is generated at the client device by applying a second concatenated value to the AG module, wherein the second concatenated value comprises a second DT value, a second AT value, a second AE value, and a second AG value;
    comparing the first TDS and the third TDS; and
    if the first TDS matches the third TDS, indicating that the client device is verified; and
    if the first TDS does not match the third TDS, indicating that the client device is not verified.

11. The method of claim 10 further comprising:
    receiving the second concatenated value at the server;
    generating, at the server, a fourth TDS by using the second concatenated value;
    comparing the first TDS and the fourth TDS; and
    if the first TDS matches the fourth TDS, indicating that the client device is verified; and
    if the first TDS does not match the fourth TDS, indicating that the client device is not verified.

12. The method of claim 8 further comprising:
    issuing a seeded AE module to the client device, wherein the seeded AE module is seeded with the first DT value, the first AT value, a user specific value, and a pseudo random number; and
    registering the seeded AE module to the client device and user.

13. The method of claim 8 further comprising:
    issuing a seeded AG module to the client device, wherein the seeded AG module is seeded with the first DT value, the first AT value, a user specific value, and a pseudo random number; and
    registering the seeded AG module to the client device and user.

14. The method of claim 13, wherein the generating the second TDS comprises applying the first concatenation value to the seeded AG module.

15. A non-transitory computer readable medium including computer executable code, which, when executed on a computer, cause the computer to perform a method comprising:
    generating a first concatenated value at a client device during notarization of the client device to use an application, wherein the generating comprises concatenating a first device tamper (DT) value generated by running a DT check on the client device with a first application tamper (AT) value generated by running an AT check on the application, wherein the first DT value and the first AT value comprise hash values; and
    generating a first transaction data signature (TDS) at the client device, wherein the generating of the first TDS comprises applying the first concatenated value to an authentication generation (AG) module.

16. The non-transitory computer readable medium of claim 15, wherein the generating of the first concatenated value further comprises concatenating an application encryption (AE) value and an AG value with the first DT value and the first AT value.

17. The non-transitory computer readable medium of claim 15, wherein the AE value is for an AE module that is seeded with the DT value, the AT value, a user specific value, and a pseudo random number, further wherein the AG value is for the AG module, wherein the AG module is seeded with the DT value, the AT value, the user specific value, and the pseudo random number.

18. The non-transitory computer readable medium of claim 17, wherein the AG module is a two factor AG module.

* * * * *